United States Patent
Futatsugi et al.

(10) Patent No.: US 9,476,533 B2
(45) Date of Patent: Oct. 25, 2016

(54) ENHANCED FLUID ATTENUATORS AND METHODS, ESPECIALLY USEFUL FOR AIRCRAFT HYDRAULIC SYSTEMS

(71) Applicant: EMBRAER S.A., São José dos Campos (BR)

(72) Inventors: Sideto Futatsugi, São José dos Campos (BR); Francisco Keller Klug, São José dos Campos (BR); André Gasparotti, São José dos Campos (BR)

(73) Assignee: EMBRAER S.A., São José Dos Campos (BR)

( * ) Notice: Subject to any disclaimer, the term of this patent is extended or adjusted under 35 U.S.C. 154(b) by 0 days.

(21) Appl. No.: 14/595,838

(22) Filed: Jan. 13, 2015

(65) Prior Publication Data

US 2016/0201836 A1    Jul. 14, 2016

(51) Int. Cl.
*F16K 47/02* (2006.01)
*F16L 55/033* (2006.01)

(52) U.S. Cl.
CPC .................... *F16L 55/033* (2013.01)

(58) Field of Classification Search
CPC .................................................. F06L 55/033
USPC ................................................. 181/233, 250
See application file for complete search history.

(56) References Cited

U.S. PATENT DOCUMENTS

| | | | | |
|---|---|---|---|---|
| 2,297,046 A | * | 9/1942 | Bourne | 181/250 |
| 3,061,039 A | * | 10/1962 | Peters | 181/233 |
| 4,350,223 A | * | 9/1982 | Takei | 181/229 |
| 5,493,080 A | * | 2/1996 | Moss | 181/232 |
| 6,155,378 A | | 12/2000 | Qatu et al. | |
| 6,508,331 B1 | * | 1/2003 | Stuart | 181/250 |
| 7,896,403 B2 | * | 3/2011 | Zanardi | 285/133.11 |
| 2004/0262077 A1 | * | 12/2004 | Huff et al. | 181/250 |
| 2005/0194207 A1 | * | 9/2005 | Nemit et al. | 181/250 |
| 2005/0230182 A1 | * | 10/2005 | Nezan et al. | 181/250 |
| 2006/0065479 A1 | * | 3/2006 | Okawa et al. | 181/250 |

OTHER PUBLICATIONS

J. Sewall et al., "An Investigation of Hydraulic-Line Resonance and Its Attenuation", NASA Technical Memorandum, National Aeronautics and Space Administration, NASA TM X-2787, Dec. 1973, 80 pages.

* cited by examiner

*Primary Examiner* — Forrest M Phillips
(74) *Attorney, Agent, or Firm* — Nixon & Vanderhye P.C.

(57) ABSTRACT

Fluid attenuator systems and methods for attenuating fluid ripple waves within a main fluid line (e.g., a main hydraulic fluid line of an aircraft hydraulic system). At least one attenuator branch conduit may be provided in fluid communication with and at substantially a right angle to the main fluid line with a porous material positioned therewithin (e.g., at an open inlet or a closed distal end of the at least one attenuator branch conduit). The porous material may be a metallic or ceramic open-cell foam material. Multiple attenuator branch conduits may be provided with each having a different length as compared to the others. In such embodiments, the porous material may (or may not) be positioned within the different length attenuator branch conduits (e.g., at an open inlet or a closed distal end of respective ones of attenuator branch conduits).

30 Claims, 2 Drawing Sheets

ENHANCED FLUID ATTENUATORS AND METHODS, ESPECIALLY USEFUL FOR AIRCRAFT HYDRAULIC SYSTEMS

FIELD

The embodiments disclosed herein relate generally to attenuators and methods whereby noise generated pressure pulses in a fluid system may be lessened.

BACKGROUND

Pumps are conventionally used in hydraulic systems in order to pressurize the hydraulic fluid within the hydraulic conduit lines. The pump generates a dynamic fluctuation of the hydraulic pressure over the mean static pressure of work performed by the pressurized hydraulic fluid. This hydraulic pressure fluctuation is known colloquially in the art as "ripple" and generates a very high amplitude sound pressure noise at high frequency. The main path of vibroacoustic energy flow is fluid-borne. Such fluid-borne vibroacoustic energy can be manifested by audible and objectionable noise which also can cause fatigue wear of hydraulic system components.

It is therefore conventional practice to employ an attenuator to minimize the vibroacoustic energy flow in hydraulic systems. Due to design simplicity and low pressure losses, it is typical to employ a reflective (or reactive) attenuator so as to attenuate ripple noise in pump-activated hydraulic systems. The basic principle of a reflective attenuator is to reflect the fluid pulse back toward the source, e.g., the pump in a pump-activated hydraulic system. Typical known expansion reflective attenuators include expansion chambers, Helmoltz resonators and lateral branches (e.g., as disclosed in NASA Technical Memorandum X-2787, December 1973, the entire content of which is expressly incorporated hereinto by reference). In all such types of reflective attenuators, the attenuator cavity is tuned to a specific frequency based on the fluid pulse wavelength. Helmoltz resonator and lateral branch resonators will have a narrow range of optimum performance.

The use of reflective attenuators can lead to between about 20 dB to about 40 dB decrease in the frequency of interest. The principle disadvantages of currently known reflective attenuators include (i) a narrow frequency range of optimum performance (e.g., for non-constant speed pumps only a certain operational condition can be optimized such that the performance of the attenuator is highly affected should the operational condition be at variance to the predetermined condition for which the attenuator is tuned), and (ii) the occurrence of substantial back pressure (e.g., the reflected pulse back to the pump outlet can lead to accelerated component wear).

A hydraulic attenuator has also been proposed by U.S. Pat. No. 6,155,378 (the entire content of which is expressly incorporated hereinto by reference). The attenuator suggested by the US '378 patent functions as a dissipater and has the characteristic of broadband actuation of frequency but without high performance at any specific frequency range. In order to achieve this result, the US '378 patent proposes a multi-chamber solution to attenuate fluid-borne noise by dividing an attenuator conduit hose or pipe assembly serially into tuning chambers by a restrictor or other mechanism.

As can be appreciated, there still exists a need in this art to provide hydraulic attenuation of fluid-borne ripples which can function over a wider range of frequencies. It is towards fulfilling such need that the embodiments disclosed herein are directed.

SUMMARY

Broadly, the embodiments disclosed herein are directed toward fluid attenuator systems and methods for attenuating fluid ripple waves within a main fluid line. At least one attenuator branch conduit may be provided in fluid communication with and at substantially a right angle to the main fluid line with a porous material positioned therewithin (e.g., at an open inlet (proximal) end of the at least one attenuator branch conduit at a juncture with the main fluid line or at a closed (distal) end of the branch conduit relative to the main fluid line). The porous material may be a metallic or ceramic open-cell foam material.

According to certain embodiments, multiple attenuator branch conduits are provided, with each such branch conduit being at a substantially right angle to the main fluid line. Each such branch conduit may also include a porous material therewithin (e.g., at an open (proximal) inlet end thereof or a closed (distal) end thereof). Alternatively or additionally, each of the multiple attenuator branch conduits at substantially right angle to the main fluid line has a different length dimension. The porous material may (or may not) be positioned within the open (proximal) inlet end or the closed (distal) end of predetermined ones of such different length attenuator branch conduits.

In order to attenuate hydraulic fluid ripple waves in a main hydraulic line of a hydraulic system, therefore, at least one attenuator branch conduit may be provided in fluid communication with and at substantially a right angle to a main hydraulic line of a hydraulic system with a porous material being positioned therewithin. Alternatively or additionally, multiple attenuator branch conduits may be provided in fluid communication with and at substantially a right angle to the main fluid line, wherein each one of the multiple attenuator branch conduits has a length dimension which is different from others of the multiple attenuator branch conduits. The multiple attenuator branch conduits of different length may (or may not) be provided with a porous material at an open (proximal) inlet end thereof or a closed (distal) end thereof.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
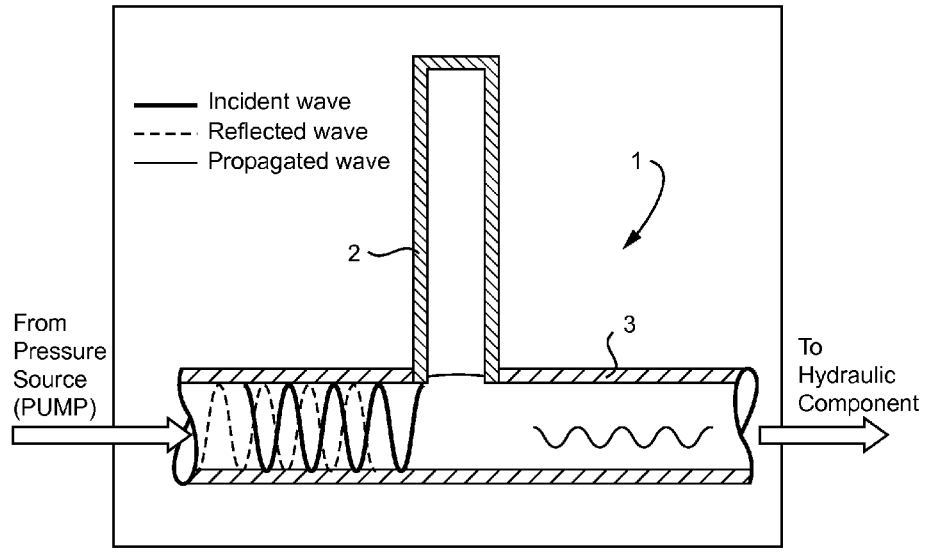
FIG. 1 is a schematic diagram of a conventional single branch attenuator.

As shown in accompanying FIG. 1, a conventional single branch attenuator system 1 includes an attenuator branch 2 in the form of a closed-end tube which is oriented at substantially a right angle relative to the main hydraulic line 3. As can be seen, in the single branch attenuator system 1 shown in FIG. 1, the incident ripple wave created by the hydraulic pressure source (e.g., the hydraulic pump) is attenuated substantially by the attenuator branch 2 so that the amplitude of the propagated wave downstream of the branch 2 is substantially less. However, there is still a rather large reflected wave upstream of the branch 2 which, as noted previously, can cause problems with the pressure source (e.g., by accelerating pump component wear).

Figure 2:
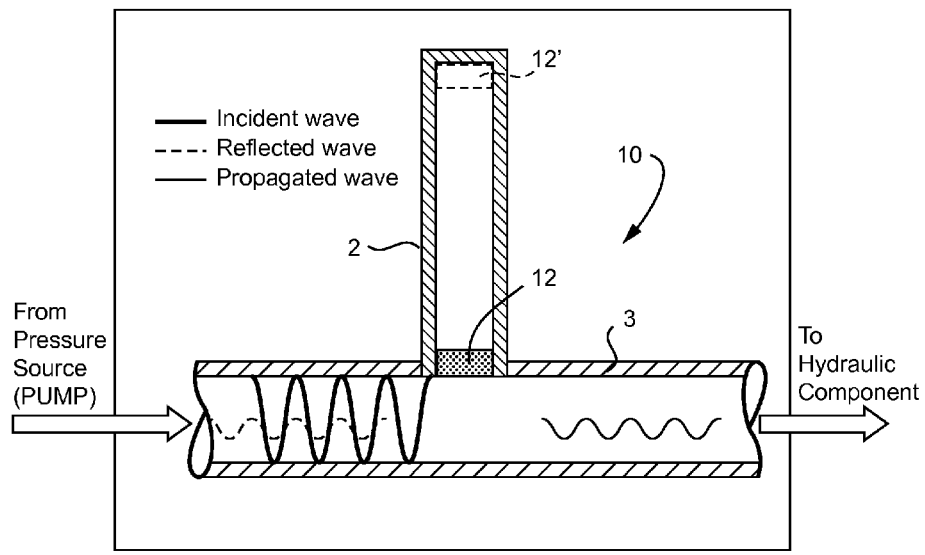
FIG. 2 is a schematic diagram of a single branch attenuator in accordance with an embodiment of the invention.

In order to address the problem associated with large reflected waves, the embodiment of the attenuator system 10 as shown in FIG. 2 includes a porous member 12 at the open inlet (proximal) end of the attenuator branch 2 (i.e., the fluid-communication junction between the attenuator branch 2 and the main hydraulic line 3) positioned therewithin. The present applicants have discovered that positioning the porous member 12 as depicted in FIG. 2 serves to provide an intra-fluid dampening mechanism so that both the propagated and the reflected waves are substantially less in terms of both amplitude and frequency as compared to the incident wave. Alternatively, the porous member 12 may be positioned at the closed (distal) end of the attenuator branch 2 as shown in FIG. 2 by dashed lines and represented by reference numeral 12'.

The porous material may be virtually any metallic (e.g., copper, stainless steel and the like) or ceramic open-celled foam materials consisting of an interconnected network of solid struts. The porosity will depend on the hydraulic fluid properties and/or the hydraulic frequency intended to be dampened. The porosity of the material may be between about 75% to about 99%, preferably between about 90% to about 99%, with a relative density (i.e., the unit volume density of the porous material relative to a unit volume density of the non-porous material) of between about 2% to about 15%.

Figure 3:
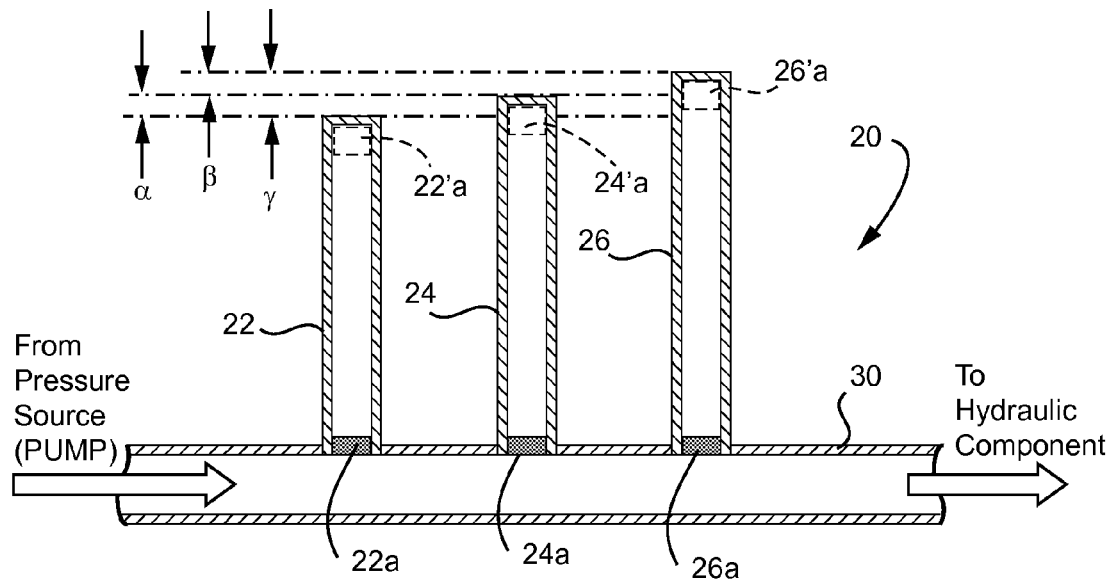
FIG. 3 is a schematic diagram of a multiple branch attenuator in accordance with another embodiment of the invention.
Figure 4:
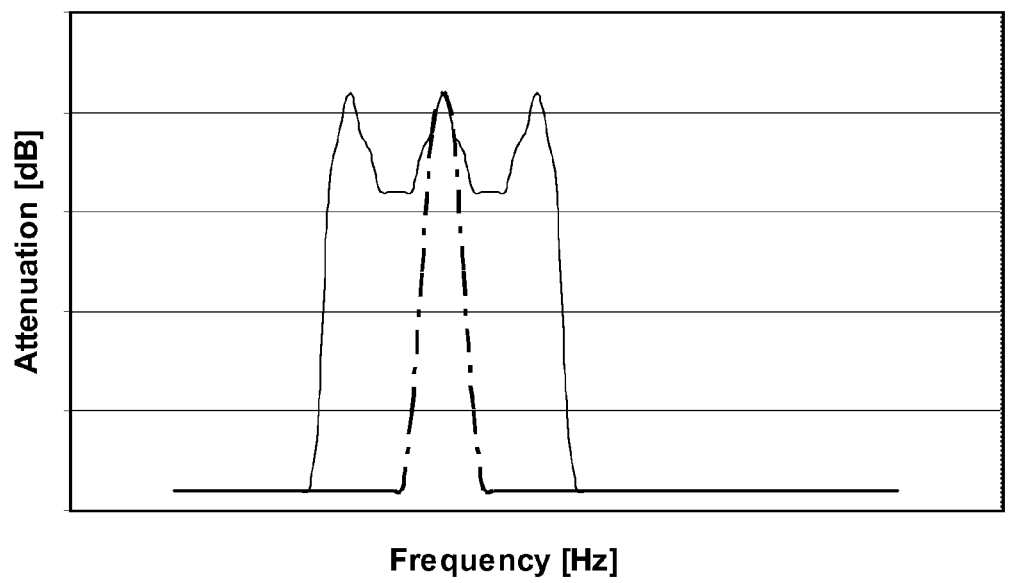
FIG. 4 is a performance graph of the multiple branch attenuator depicted in FIG. 1 showing fluid attenuation (dB) as a function of frequency (Hz).

Accompanying FIG. 3 depicts another embodiment of the present invention. As shown therein, the attenuator system 20 includes a series of multiple attenuator branches 22, 24 and 26 each being positioned at substantially right angles to the main hydraulic line 30. In order to provide broadband attenuation over a wide range of fluid pulse frequencies, the dimensional lengths of each branch 22, 24 and 26 varies relative to one another by dimensions α, β and γ. The net result of the attenuation achieved by such length variation between the attenuator branches 22, 24 and 26 is shown by FIG. 4. Specifically, as compared to a conventional single branch attenuator of the type shown in FIG. 1 having a relative narrow frequency band of attenuation (noted by the chain line trace in FIG. 4), the multiple variable length attenuator branches 22, 24 and 26 achieve a much broader frequency band of attenuation (shown by the solid line trace in FIG. 4). At the same time, the attenuator branches 22, 24 and 26 still provide substantially high attenuation capabilities as compared to a single branch attenuator.

In order to minimize the reflected wave amplitude and frequency, the open inlet (distal) ends of each attenuator branch 22, 24 and 26 (i.e., the fluid-communication junction between the attenuator branches 22, 24 and 26 and the main hydraulic line 30) includes a porous material 22a, 24a and 26a positioned therewithin, respectively. Alternatively, the porous members 22a, 24a and/or 26a may be positioned at the respective closed (distal) ends of the attenuator branches 22, 24 and/or 26 as shown in FIG. 3 by dashed lines.

The invention herein is not to be limited to the disclosed embodiments, but on the contrary, is intended to cover various modifications and equivalent arrangements included within the spirit and scope of the appended claims.

What is claimed is:

1. An aircraft hydraulic system comprising:
   a main hydraulic fluid line,
   a hydraulic pump fluid connected to the main hydraulic fluid line which hydraulically generates dynamic pressure fluctuations of hydraulic fluid in the main hydraulic fluid line when operated, and
   a hydraulic fluid attenuator system downstream of the hydraulic pump for attenuating the dynamic pressure fluctuations of the hydraulic fluid within the main hydraulic fluid line, wherein the fluid attenuator system comprises:
   (i) at least one attenuator branch conduit in fluid communication with and at substantially a right angle to the main hydraulic fluid line; and
   (ii) a porous material positioned within the at least one attenuator branch conduit.

2. The aircraft hydraulic system as in claim 1, wherein the porous material of the hydraulic fluid attenuator system is positioned within the at least one attenuator branch at an open proximal end thereof at a juncture with the main hydraulic fluid line.

3. The aircraft hydraulic system as in claim 1, wherein the porous material of the hydraulic fluid attenuator system is positioned within the at least one attenuator branch at a closed distal end thereof relative to the main hydraulic fluid line.

4. The aircraft hydraulic system as in claim 1, wherein the porous material of the hydraulic fluid attenuator system is a metallic or ceramic open-cell foam material.

5. The aircraft hydraulic system as in claim 1, wherein the hydraulic fluid attenuator system further comprises multiple attenuator branch conduits each at a substantially right angle to the main hydraulic fluid line, wherein each of the multiple attenuator branch conduits includes a porous material positioned therewithin.

6. The aircraft hydraulic system as in claim 5, wherein the porous material of the hydraulic fluid attenuator system is positioned within the multiple attenuator branch conduits at an open proximal end thereof at a juncture with the main hydraulic fluid line.

7. The aircraft hydraulic system as in claim 5, wherein the porous material of the hydraulic fluid attenuator system is positioned within the multiple attenuator branch conduits at a closed distal end thereof relative to the main hydraulic fluid line.

8. The aircraft hydraulic system as in claim 1, wherein the hydraulic fluid attenuator system further comprises multiple attenuator branch conduits each at substantially right angle to the main hydraulic fluid line, wherein each of the multiple attenuator branch conduits has a different length dimension.

9. The aircraft hydraulic system as in claim 8, wherein each of the multiple attenuator branch conduits has a porous material.

10. The aircraft hydraulic system as in claim 9, wherein the porous material of the hydraulic fluid attenuator system is positioned within the multiple attenuator branch conduits at an open proximal end thereof at a juncture with the main hydraulic fluid line.

11. The aircraft hydraulic system as in claim 9, wherein the porous material of the hydraulic fluid attenuator system is positioned within the multiple attenuator branch conduits at a closed distal end thereof relative to the main hydraulic fluid line.

12. An aircraft hydraulic system comprising:
a main hydraulic fluid line,
a hydraulic pump fluid connected to the main hydraulic fluid line which hydraulically generates dynamic pressure fluctuations of hydraulic fluid in the main hydraulic fluid line when operated, and
a hydraulic fluid attenuator system downstream of the hydraulic pump for attenuating the dynamic pressure fluctuations of the hydraulic fluid within the main hydraulic fluid line, wherein the fluid attenuator system comprises:
  (i) multiple attenuator branch conduits each in fluid communication with and at substantially a right angle to the main hydraulic fluid line, wherein
  (ii) each one of the multiple attenuator branch conduits has a length dimension which is different from others of the multiple attenuator branch conduits.

13. The aircraft hydraulic system as in claim 12, wherein each of the multiple attenuator branch conduits of the fluid attenuator system has a porous material positioned therewithin.

14. The aircraft hydraulic system as in claim 13, wherein the porous material is positioned within the multiple attenuator branch conduits at an open proximal end thereof at a juncture with the main hydraulic fluid line.

15. The aircraft hydraulic system as in claim 13, wherein the porous material is positioned within the multiple attenuator branch conduits at a closed distal end thereof relative to the main hydraulic fluid line.

16. A method of attenuating dynamic pressure fluctuations in hydraulic fluid caused by operating a hydraulic pump in fluid communication with a main hydraulic fluid line of an aircraft hydraulic system, comprising:
  (i) providing at least one attenuator branch conduit downstream of the hydraulic pump in fluid communication with and at substantially a right angle to the main hydraulic fluid line of the aircraft hydraulic system; and
  (ii) positioning a porous material within the at least one attenuator branch conduit.

17. The method as in claim 16, wherein the porous material is positioned within the at least one attenuator branch at an open proximal end thereof at a juncture with the main hydraulic fluid line.

18. The method as in claim 16, wherein the porous material is positioned within the at least one attenuator branch at a closed distal end thereof relative to the main hydraulic fluid line.

19. The method as in claim 16, wherein the porous material is a metallic or ceramic open-cell foam material.

20. The method as in claim 16, further comprising providing multiple attenuator branch conduits each at a substantially right angle to the main hydraulic fluid line, wherein each of the multiple attenuator branch conduits includes a porous material therewithin.

21. The method as in claim 20, wherein the porous material is positioned within the multiple attenuator branch conduits at an open proximal end thereof at a juncture with the main hydraulic fluid line.

22. The method as in claim 20, wherein the porous material is positioned within the multiple attenuator branch conduits at a closed distal end thereof relative to the main hydraulic fluid line.

23. The method as in claim 16, further comprising multiple attenuator branch conduits each at substantially right angle to the main hydraulic fluid line, wherein each one of the multiple attenuator branch conduits has a different length dimension as compared to others of the multiple attenuator branch conduits.

24. The method as in claim 23, wherein each of the multiple attenuator branch conduits has a porous material therewithin.

25. The method as in claim 24, wherein the porous material is positioned within the multiple attenuator branch conduits at an open proximal end thereof at a juncture with the main hydraulic fluid line.

26. The method as in claim 24, wherein the porous material is positioned within the multiple attenuator branch conduits at a closed distal end thereof relative to the main hydraulic fluid line.

27. A method for attenuating dynamic pressure fluctuations in hydraulic fluid caused by operating a hydraulic pump in fluid communication with a main hydraulic fluid line of an aircraft hydraulic system, comprising providing multiple attenuator branch conduits each in fluid communication with and at substantially a right angle to the main hydraulic fluid line, wherein each one of the multiple attenuator branch conduits has a length dimension which is different from others of the multiple attenuator branch conduits.

28. The method as in claim 27, wherein each of the multiple attenuator branch conduits has a porous material therewithin.

29. The method as in claim 28, wherein the porous material is positioned within the multiple attenuator branch conduits at an open proximal end thereof at a juncture with the main hydraulic fluid line.

30. The method as in claim 28, wherein the porous material is positioned within the multiple attenuator branch conduits at a closed distal end thereof relative to the main hydraulic fluid line.

* * * * *